United States Patent [19]

Worsham

[11] 4,292,722
[45] Oct. 6, 1981

[54] RENEWABLE NUT FOR A LEAD SCREW DRIVE AND METHOD OF MAKING SAME

[75] Inventor: Daniel A. Worsham, San Jose, Calif.
[73] Assignee: Pacific Western Systems, Inc., Mountain View, Calif.
[21] Appl. No.: 66,095
[22] Filed: Aug. 13, 1979
[51] Int. Cl.³ .......................... B22D 19/10; B23P 7/00
[52] U.S. Cl. .............................. 29/402.21; 29/402.05; 29/527.1; 82/27; 74/409; 74/424.8 VZ; 74/841; 74/459; 219/209; 219/385; 219/389; 219/547; 219/535; 219/544
[58] Field of Search ........... 29/402.01, 402.18, 402.21, 29/527.1, 527.2, 402.05; 74/409, 840, 841, 424.8VZ; 219/209, 385, 221, 389, 59.1, 50, 67, 272, 520, 535, 541, 544, 547; 82/27

[56] References Cited

U.S. PATENT DOCUMENTS 2,586,044 2/1952 Horsky .............................. 74/409 X
3,376,534 4/1968 Aguirre ....................... 74/424.8 VZ

FOREIGN PATENT DOCUMENTS 640837 1/1979 U.S.S.R. ........................... 29/402.18

Primary Examiner—Nicholas P. Godici
Assistant Examiner—V. K. Rising
Attorney, Agent, or Firm—Harry E. Aine; Harvey G. Lowhurst

[57] ABSTRACT

In a lead screw drive, such as that used in a lightweight lathe or milling machine for driving the workpiece relative to the cutting tool, the core of a drive nut is made of a material having a relatively low melting temperature, such as babbitt metal or a relatively rigid thermoplastic material. The low melting point material is contained within a nut housing as of steel. The openings in the nut housing for passage of the lead screw are sealed in a fluid type relation by means of elastic sealing members as of silicone rubber having a melting point above that of the relatively low melting point core portion of the nut. An electrical heating cartridge element is contained within the nut housing in good thermally conductive relation with the low melting point core material. When backlash develops due to wear of the core material of the nut, the heating element is energized under control of a controller to melt the core of the nut so that the core material is caused to flow and to reform itself to the thread profile of the lead screw. A thermocouple disposed in thermally conductive relation with the core senses the temperature of the core. A controller responsive to the sensed temperature, causes the nut to cool in accordance with a predetermined sequence of time and temperature and to be run in on the lead screw while lubricant is caused to be sprayed on the lead screw.

9 Claims, 3 Drawing Figures

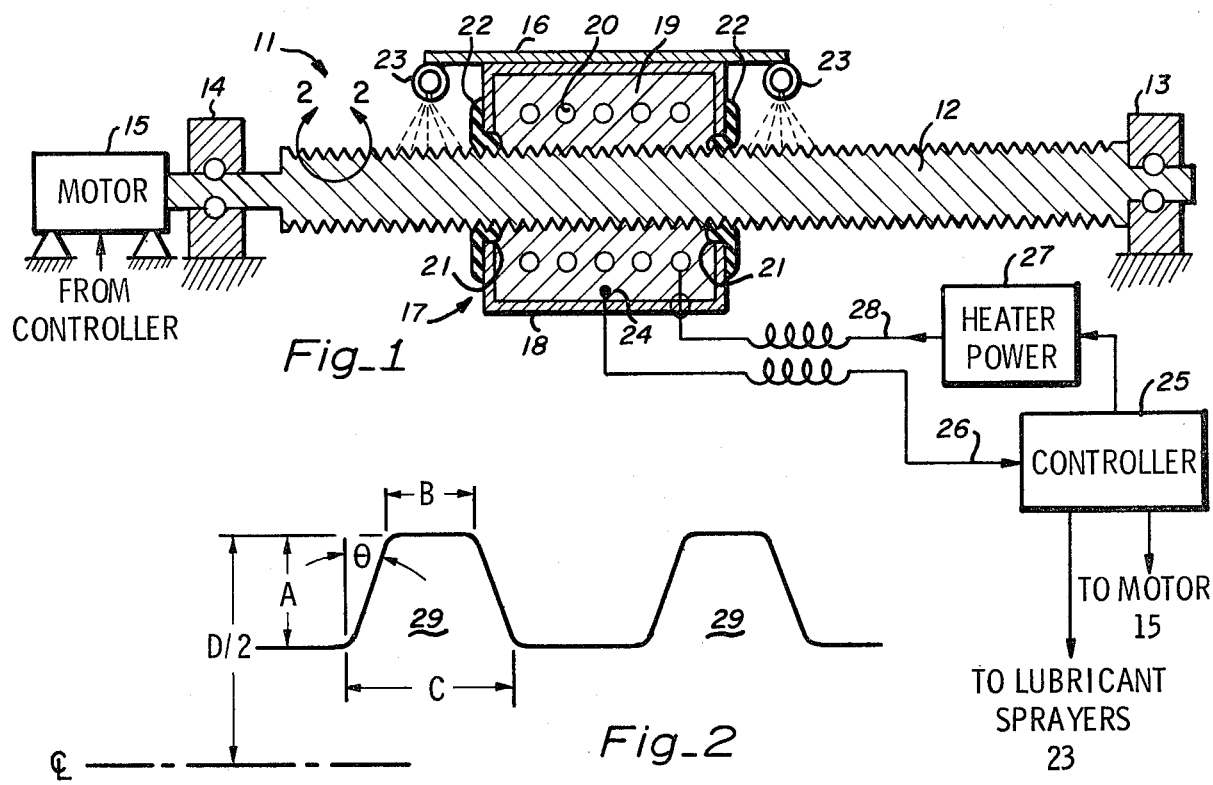
Fig_1
Fig_2
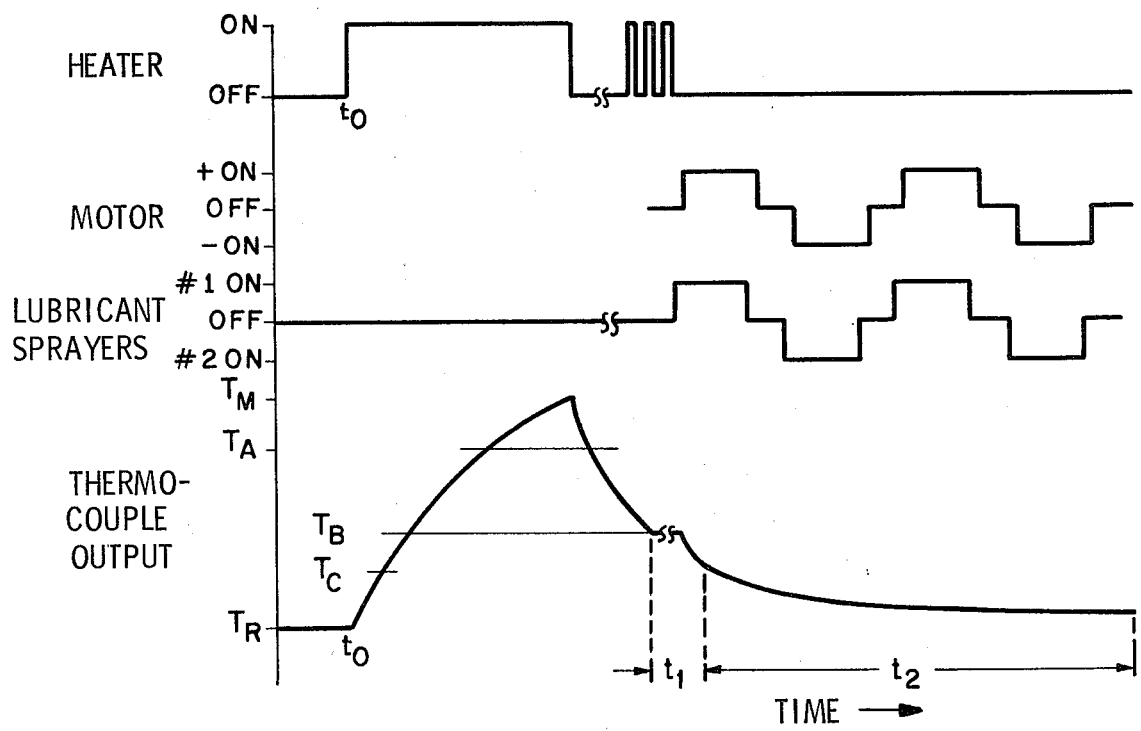
Fig_3

RENEWABLE NUT FOR A LEAD SCREW DRIVE AND METHOD OF MAKING SAME

BACKGROUND OF THE INVENTION

The present invention relates in general to lead screw drive mechanisms particularly suitable for driving the workpiece carriage of a light weight milling machine or lathe, and more particularly, to a method and apparatus for renewing the threads of a drive nut so as to eliminate backlash.

DESCRIPTION OF THE PRIOR ART

Heretofore, thermoplastic inserts have been employed as locking mechanisms for locking a nut to a screw or bolt. Such lock nut inserts have been cast in place and have included the use of thermoplastic resins. Examples of such prior art plastic inserts are found in the following U.S. Pat. Nos. 2,506,477; 2,316,338; 2,410,730; 2,983,534; 2,390,759; and 2,421,105.

It is also known from the prior art of semiconductor wafer probe testers to employ a lead screw drive including a drive nut wherein the drive nut is made of an epoxy resin cast in place on the lead screw. Such a nut was utilized for driving a wafer chuck relative to an array of electrical probers for probing integrated circuit devices formed in the wafer.

Lathes and milling machines conventially employ lead screw drives for driving the workpiece carriage relative to the tool. However, with use, the threads of the nut and lead screw become worn and develop backlash or play which manifest itself as an inaccuracy or slop in the vernier scale readings employed by the operator for precisely locating the tool relative to the workpiece. These inaccuracies in the vernier scale reading are particularly noticeable when the direction of the motion of the workpiece relative to the tool is reversed from a previous setting. Heretofore, backlash has been remedied by replacing the drive nut and/or lead screw. However, this is a relatively costly and time consuming fix.

SUMMARY OF THE INVENTION

The principal object of the present invention, is the provision of an improved lead screw drive mechanism, and more particularly to an improved method and apparatus for renewing the drive nut.

In one feature of the present invention, the drive nut includes a relatively low melting point core material which is renewed by raising the temperature of the core material above its melting point to cause it to flow and conform to the thread profile of the lead screw and then allowing the core material to freeze in the renewed state.

In another feature of the present invention, the renewable nut includes a housing for housing the low melting point core material and a heating element is disposed within the housing whereby heating of the core material is facilitated in use.

In another feature of the present invention, the renewable nut housing includes sealing members for sealing the nut housing to the lead screw to prevent the escape of liquid core material when the nut is being renewed.

In another feature of the present invention, a heat sensing element senses the temperature of the core material when the nut is being renewed.

In another feature of the present invention, a controller is responsive to the sensed temperature of the core of the nut to control the temperature cycling of the renewable nut and to actuate a motor drive to cause the renewed nut to be run in on the lead screw.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view, partly in schematic block diagram form, depicting features of the present invention, FIG. 2 is an enlarged view of a portion of the structure of FIG. 1 delineated by line 2—2 and depicting the thread profile of the lead screw, and FIG. 3 is a timing diagram depicting the wave forms of the heater power, motor current, lubricant spray current and temperature for the thermal cycle of the apparatus of FIG. 1.

DESCRIPTION OF THE PREFERRED EMBODIMENTS

Referring now to FIG. 1 there is shown a lead screw drive mechanism 11 incorporating features of the present invention. The lead screw drive mechanism 11 includes a lead screw 12 mounted to a rigid support via a pair of thrust ball bearing assemblies 13 and 14 at opposite ends of the lead screw 12. A motor 15 is mounted to the support and is coupled to the ends of the lead screw 12 for turning same about its axis of revolution.

A workpiece carriage 16 is mounted for rectilinear translation along the longitudinal axis of the lead screw 12. The workpiece carriage 16 is coupled to the drive screw 12 via a drive nut 17.

The drive nut 17 includes a sheet metal housing 18 containing a relatively low melting point core material 19 as of babbitt metal alloy. Opposite end walls of the housing 18 are apertured at 21 in alignment with the lead screw 12 for passage of the lead screw therethrough. Elastic grommets 22, as of silicone rubber, are affixed to opposite end walls of the housing 18 and bear in sealing engagement with the lead screw 12 passing therethrough. A cartridge electrical heating element is disposed within the housing 18 in coaxial relation with the lead screw 12 for heating the core material 19, in use. A pair of nozzles 23 are carried from the carriage 16 in positions for directing a spray of lubricant onto the lead screw 12 at opposite ends of the housing 18. Lubricant is supplied to the nozzles 23 from a reservoir, not shown, via flexible conduits, not shown.

A thermocouple 24 is embedded in the core material 19 within the housing 18. The thermocouple 24 is electrically connected to one input of a controller 25 via a flexible lead 26. A source of heater power 27 is connected to the heating element 20 via a flexible electrical cable 28.

Referring now to FIG. 2 there is shown a typical thread profile for the thread on the drive screw 12. The thread comprises a helical land 29 of a predetermined pitch, such land having a depth A for example 0.020 to 0.025 inch, a tip land width, B, of for example 0.020 to 0.125 inch, a root width, C, of 0.040 to 0.025 inch, a face angle $\theta$ of 5 to 30 degrees and a diameter, D, of 0.50 to 2.0 inch.

In use, the lead screw and drive nut 17 are utilized in relatively light duty milling machines or lathes for positioning the workpiece relative to the cutting tool. With use, the lead screw 12 and nut 17 will wear producing backlash. The backlash is removed by renewing the conformation of the threads of the nut to the threads of the lead screw 12. The nut renewing cycle is described by reference to FIGS. 1 and 3. When it is desired to renew the nut 17, the operator 17 actuates the controller 25 which includes an internal sequencer which turns on the heater power to the heater cartridge 20 at time $t_o$. The heater power stays on until the temperature of the core material 19, as sensed by thermocouple 24, reaches a certain maximum temperature $T_M$. $T_M$ is chosen to be above the melting point $T_A$ of the core material 19. When the temperature of the core material 19 exceeds the melting point, the core material liquifies and flows into conformance with the thread profile of the lead screw 12.

When the maximum temperature $T_M$ is reached, the controller 25, which includes an internal comparator circuit, senses that $T_M$ has been reached and turns off the heater power. The core material 19 is then allowed to cool until such time as the sensed temperature receeds to a predetermined moderately hot temperature. The controller 25 then turns on the heating element 20 and adjusts its duty cycle so as to maintain the temperature of the core material 19 at the annealing temperature $T_B$ for a predetermined length of time $t_1$. After the annealing portion of the cycle, the controller 25, again turns off the current to the heating element 20 and the core material 19 is allowed to cool from the annealing temperature down to a lower temperature $T_C$ which is above room temperature $T_R$. $T_C$ is chosen so that it provides a slight amount of softening of the core material of the nut 17. When the temperature reaches $T_c$ the controller senses that this threshold has been reached by means of an internal comparator and responds by energizing a lubricant sprayer for spraying lubricant onto the lead screw slightly ahead of (in the direction of advancement) the nut 17 along the lead screw 12. In this manner, lubricant is carried into the interface between the threads of the core material 19 and the threads of the lead screw for lubricating same. Also, the controller 25 turns on the motor current for driving the lead screw 12 in the predetermined direction. The controller causes the motor 15 to run a sufficient length of time until the nut reaches one extreme of travel at which point a limit switch is tripped which causes the drive nut to be repetitively driven a predetermined number of times to and fro along the lead screw 12 while the temperature of the core material 19 is cooling toward the room temperature. After a predetermined number of nut run in cycles have been performed, the controller ceases operation and the core material cools to room temperature. This concludes the renewing cycle of the nut 17, and the machine is ready for operation free of backlash.

The advantage to the renewable drive nut is that backlash can be eliminated without time consuming and expensive dismantling and changing of parts within the lead screw drive mechanism of the milling machine or lathe or other apparatus employing the lead screw drive of the present invention.

As thus far described, the nut 17 has surrounded the lead screw 12. However, this is not a requirement. The nut 17 may only partially surround the lead screw 12 in which case the side of the nut housing 17 would be open. In such a case, the elastic sealing member 22 would extend along the marginal lip of the side opening for sealing the nut housing 18 to the lead screw 12.

What is claimed is:

1. In a method for renewing a lead screw drive mechanism to remove backlash therefrom, the steps of:
   threadably mating a lead screw with a nut, the threaded portion of said nut being made of a core material to be melted in place;
   heating the threaded core portion of said nut while in threadable engagement with the threaded portion of said lead screw to cause said threaded portion of said nut to melt and to flow and to conform to the thread profile lead screw; and
   allowing the melted core portion of said nut to cool and to solidify while threadably mated with said lead screw such that the threaded portion of said nut is renewed to conform to the thread profile of said lead screw, thereby renewing the thread of the nut and reducing backlash of the lead screw drive mechanism.

2. The method of claim 1 including the steps of running said nut to and fro along said lead screw while allowing said nut to cool, whereby said nut is run-in on said lead screw.

3. The method of claim 2 including the step of lubricating said nut and lead screw while said nut is being run-in on said lead screw.

4. The method of claim 1 including the step of sealing said nut to said lead screw while melting of said core portion of said nut to prevent escape of said melted portion of said nut from the remainder of said nut.

5. The lead screw mechanism renewed by the method of claim 1.

6. In a renewable lead screw drive mechanism:
   lead screw means having an elongated externally threaded body;
   nut means having an internally threaded core portion for threadably mating with the external thread of said lead screw, said core portion of said nut being made of a material having a relatively low melting temperature;
   heating means for heating said core portion of said nut means while said nut means is in threadable engagement with the thread of said lead screw to cause said core portion of said nut means to melt and to flow and to conform to the thread profile of said mated lead screw such that as said melted core portion of said nut means cools it will solidify for conforming the threaded portion of said nut to the thread profile of said lead screw means, thereby renewing the thread of said nut and reducing backlash of the lead screw mechanism.

7. The apparatus of claim 6 including, controller means for running said nut means to and fro along said lead screw means while said core portion of said nut means is cooling, whereby said nut means is run-in on said lead screw means.

8. The apparatus of claim 7 including, lubricating means for lubricating said nut means and said lead screw means while said nut means is being run-in on said lead screw means.

9. The apparatus of claim 6 including, sealing means for sealing said nut means to said lead screw means while said core portion of said nut means is melted to prevent escape of said melted portion of said nut means from the remainder of said nut means.

* * * * *